(12) United States Patent
Klomp et al.

(10) Patent No.: US 12,377,880 B2
(45) Date of Patent: Aug. 5, 2025

(54) METHOD FOR ASCERTAINING A VEHICLE TRAJECTORY

(71) Applicant: Volkswagen Aktiengesellschaft, Wolfsburg (DE)

(72) Inventors: Sven Klomp, Uetze / Dollbergen (DE); Stephan Max, Gifhorn (DE); Frank Bärecke, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 382 days.

(21) Appl. No.: 17/609,251

(22) PCT Filed: Apr. 29, 2020

(86) PCT No.: PCT/EP2020/061958
§ 371 (c)(1),
(2) Date: Nov. 5, 2021

(87) PCT Pub. No.: WO2020/225065
PCT Pub. Date: Nov. 12, 2020

(65) Prior Publication Data
US 2022/0204048 A1    Jun. 30, 2022

(30) Foreign Application Priority Data
May 7, 2019    (DE) .......................... 102019206562.7

(51) Int. Cl.
*B60W 60/00*    (2020.01)

(52) U.S. Cl.
CPC .. *B60W 60/00184* (2020.02); *B60W 60/0051* (2020.02); *B60W 2510/22* (2013.01);
(Continued)

(58) Field of Classification Search
CPC ....... B60W 60/00184; B60W 60/0051; B60W 2510/22; B60W 2552/40; B60W 2552/53;
(Continued)

(56) References Cited

U.S. PATENT DOCUMENTS

| 10,048,700 B1 | 8/2018 | Curlander et al. |
| 2011/0282627 A1* | 11/2011 | Jang ..................... G08G 1/0112 |
| | | 702/179 |

(Continued)

FOREIGN PATENT DOCUMENTS

| DE | 102014223620 A1 | 5/2016 |
| DE | 102015014651 A1 | 5/2017 |

(Continued)

OTHER PUBLICATIONS

PCT/EP2020/061958. International Search Report (Aug. 10, 2020).

*Primary Examiner* — Jelani A Smith
*Assistant Examiner* — Alyssa Rorie
(74) *Attorney, Agent, or Firm* — Peter Zura; LOZA & LOZA, LLP (57) ABSTRACT

Technologies and techniques for ascertaining a vehicle trajectory, via a system that includes a motor vehicle and a network server. Individual trajectories of a plurality of motor vehicles being traversed, and secondary information linked to the individual trajectories are detected. The individual trajectories of the plurality of motor vehicles, and the linked secondary information may be transmitted to a network server. A swarm trajectory may be ascertained by a network server as an average of the individual trajectories using the individual trajectories and the linked secondary information, wherein the average may be weighted using the secondary information. The network server may transmit the swarm (Continued)

trajectory to at least one motor vehicle. An associated motor vehicle configured for the system and network server is further disclosed.

20 Claims, 2 Drawing Sheets

(52) U.S. Cl.
CPC ..... *B60W 2552/40* (2020.02); *B60W 2552/53* (2020.02); *B60W 2554/4041* (2020.02)

(58) Field of Classification Search
CPC ........ B60W 2554/4041; G08G 1/0129; G08G 1/0141; G08G 1/0112
See application file for complete search history.

(56) References Cited

U.S. PATENT DOCUMENTS

| | | | | |
|---|---|---|---|---|
| 2014/0074388 A1* | 3/2014 | Bretzigheimer | ... | B62D 15/0275 |
| | | | | 701/117 |
| 2015/0198449 A1* | 7/2015 | Okude | ................ | G08G 1/0112 |
| | | | | 701/408 |
| 2015/0285656 A1* | 10/2015 | Verheyen | ............. | G08G 1/0129 |
| | | | | 701/428 |
| 2017/0277195 A1* | 9/2017 | Frazzoli | ............ | B60W 30/0956 |
| 2018/0203453 A1* | 7/2018 | Hardy | .................. | G08G 1/0112 |
| 2019/0385444 A1* | 12/2019 | Inoue | ................... | G05D 1/0276 |
| 2020/0125102 A1* | 4/2020 | Jiang | ...................... | G05D 1/021 |
| 2020/0166360 A1* | 5/2020 | Jaganathan | .......... | G08G 1/0141 |
| 2020/0302789 A1* | 9/2020 | Oyama | .............. | G01C 21/3407 |
| 2020/0302793 A1* | 9/2020 | Oyama | ................... | H04L 67/52 |
| 2021/0199448 A1* | 7/2021 | Cam | ................... | G01C 21/3415 |
| 2021/0370955 A1* | 12/2021 | Wong | .................... | G07C 5/008 |
| 2022/0080961 A1* | 3/2022 | Lienke | ................. | B60W 30/10 |

FOREIGN PATENT DOCUMENTS

| | | |
|---|---|---|
| DE | 102015225242 A1 | 6/2017 |
| DE | 102016208883 A1 | 11/2017 |
| DE | 102016222782 A1 | 5/2018 |
| WO | 2016130719 A2 | 8/2016 |
| WO | 2018041490 A1 | 3/2018 |
| WO | 2018134026 A1 | 7/2018 |
| WO | 2019162027 A1 | 8/2019 |

* cited by examiner

METHOD FOR ASCERTAINING A VEHICLE TRAJECTORY

RELATED APPLICATIONS

The present application claims priority to International Patent App. No. PCT/EP2020/061958 to Klomp et al., filed Apr. 29, 2020, which further claims priority to German Pat. App. No. 10 2019 206 562.7 filed May 7, 2019, the contents of each being incorporated by reference in their entirety herein.

TECHNICAL FIELD

The present disclosure relates to technologies and techniques for ascertaining a vehicle trajectory and to a system, comprising a network server and a motor vehicle, configured to carry out the methods disclosed herein. The present disclosure furthermore relates to a motor vehicle and a network server, each configured for use in the system according to the present disclosure.

BACKGROUND

Today's vehicles already feature a plurality of assistance systems that support the driver in a computer-based manner in a plurality of driving situations. Such assistance systems can draw on sensors for detecting a plurality of measured data that by far exceed human sensory capabilities. Moreover, the speed of these assistance systems significantly surpasses human response times. Known driver assistance systems are, for example, lane-keeping assistance systems, brake assistance systems for pedestrian recognition, and adaptive cruise control systems, in particular for traffic jam situations.

As a result of the use of such assistance systems, the autonomy of the driver regarding his or her driving decisions increasingly passes to the vehicle or control units operating therein. The ultimate result of these developments is an automatically traveling vehicle, which can maneuver entirely without human intervention. As a projection of driver assistance systems, this results in fully automated passenger transportation.

In known methods, the calculation of a trajectory or of a driving path of the automatically guided vehicle takes place primarily based on the sensor values of a motor vehicle. This sensor-based data set, however, may not be sufficient in situations in which the data collection by at least one sensor is impaired. Examples of such situations include driving at night or driving during fog or heavy rain, during which the signal detection by way of optical sensors, such as cameras, LIDAR and/or acoustic sensors, such as ultrasonic sensors, can be considerably impaired.

For such situations, but also in efforts to improve the redundancy of the data set, it is therefore necessary to use additional information for determining a trajectory for an automatically guided vehicle. It is therefore an aspect of the present disclosure to enhance the prior art and to provide a method for ascertaining a trajectory for a motor vehicle, which increases the data set for ascertaining a trajectory of a vehicle, and thereby the safety of the vehicle guidance.

BRIEF SUMMARY

Aspects of the present disclosure are described in the subject matter of the independent claims. Preferred refinements are the subject matter of the respective dependent subclaims.

In some examples, a method is disclosed for ascertaining a vehicle trajectory, in particular for automatically operating a motor vehicle, based on a multitude of detected vehicle trajectories. In a first step of the method according to the present disclosure, initially a detection is made for a multitude of motor vehicles of the individual trajectories traveled by these vehicles, as is described in greater detail hereafter. In other words, each of a multitude of vehicles detects the trajectory traveled by it. These individual trajectories thus encompass information about the lane that is actually traveled by the particular vehicle, in particular information that allows unambiguous localization of the lane in the space.

In some examples, additional detection is made of secondary information that is linked to the individual trajectories. In other words, each of the multitude of motor vehicles detects secondary information that is linked in each case to the trajectory traveled by this motor vehicle. The secondary information is preferably suitable for characterizing the roadway and/or the vehicle behavior along the traveled trajectory. Preferably detected secondary information is described in greater detail hereafter.

In some examples, the multitude of motor vehicles transmit the individual trajectories detected by them and the secondary information linked to the detected individual trajectories to a network server. In other words, each of the multitude of motor vehicles transmits the individual trajectory detected by this motor vehicle, as well as the secondary information detected by this motor vehicle regarding this individual trajectory to a network server. The individual trajectory and the secondary information are preferably transmitted in a shared data transmission to the network server, in particular in a shared data structure.

In some examples, the network server receives, from a multitude of motor vehicles, the individual trajectories detected by the vehicles and the associated secondary information. As was already stated, each individual trajectory defines a lane that one motor vehicle travels and can thus be unambiguously localized in the space. As a result, individual trajectories of different motor vehicles exist, which spatially correspond to one another, that is, they relate to the same routing, for example a certain road section. The network server groups such received individual trajectories that spatially correspond to one another. These individual trajectories thus characterize the driving paths of the individual motor vehicles along a shared routing, for example along a certain road section, but differ in terms of the driving motion actually carried out by the vehicle. For example, different vehicles use different lanes of a multi-lane roadway or carry out lane changes at different points. As a result, different individual trajectories that spatially correspond to one another, nonetheless contain different pieces of information about the movements carried out by the motor vehicles.

In some examples, the network server furthermore ascertains a swarm trajectory based on the individual trajectories and the secondary information linked thereto. In other words, the network server ascertains an average trajectory based on the individual trajectories of a multitude of motor vehicles. Such an average trajectory is preferably utilized to guide a vehicle along the corresponding routing, for example while driving in a fully or semi-automated manner. Such vehicle guidance based on the swarm trajectory is advantageously independent of lane markings and the like, and is thus, in particular, suitable for use in situations in which the detection of environment data by means of at least one first sensor is impaired. To be able to utilize the swarm trajectory in this way in a motor vehicle, the swarm trajectory that was ascertained by the network server is furthermore transmitted from the network server to at least one motor vehicle, for example, a motor vehicle that is approaching a routing that spatially corresponds to the individual trajectories.

In some examples, the network server transmits the swarm trajectories that were ascertained by the network server to a vehicle as a function of a position of the vehicle. For example, when the vehicle is started up within the scope of an initial data link to the network server, which takes place at regular intervals, swarm trajectories can be transmitted for a radius surrounding the present location of the vehicle. Global swarm trajectories are likewise preferably transmitted to the vehicle, for example, during the installation or update of system software. Further preferably, the swarm trajectories are transmitted as a push message of the network server or, likewise preferably, only at the vehicle's request.

In some examples, the swarm trajectory may be ascertained based on the secondary information, and, in particular, as an average of the individual trajectories, which is weighted based on the secondary information. In other words, the influence of the individual trajectories is weighted differently by the network server during the calculation of the swarm trajectory, for example by utilizing the secondary information for determining a prefactor in the range of 0 to 1. The method according to the present disclosure advantageously incorporates additional information into the determination of the swarm trajectory.

In some examples, the secondary information may be characterized as information that is suitable for characterizing the roadway and/or the vehicle behavior along the traveled trajectory. Therefore, the method according to the present disclosure can thus be used to advantageously ascertain a particularly safe and/or particularly comfortable swarm trajectory. Furthermore, the method according to the present disclosure advantageously also allows different swarm trajectories to be ascertained for vehicles that are differently classified based on the secondary information. In this embodiment of carrying out the method, the secondary information can additionally also include information that is suitable for classifying the vehicles.

Aspects of the present disclosure can be implemented by electrical or electronic parts or components (hardware), by firmware (ASIC), or they can be realized during the execution of a suitable, tangibly-embodied, program (software). Aspects of the present disclosure are likewise preferably realized or implemented by a combination of hardware, firmware and/or software. For example, individual components for carrying out individual method steps are designed as a separate integrated circuit or arranged on a shared integrated circuit. Individual components that are configured to carry out individual method steps are further preferably arranged on a (flexible) printed circuit board (FPCB/PCB), a tape carrier package (TCP), or another substrate.

Aspects of the present disclosure may be designed as one or more processes running on one or more processors in one or more electronic processing devices, and they are generated, during execution, by one or more computer programs. The processing devices are preferably designed to cooperate with other components, for example, a communication module, as well as one or more sensors or cameras, so as to implement the functionalities described herein. The instructions of the computer programs are preferably stored in a memory, such as a RAM element. However, the computer programs can also be stored in a non-volatile memory, such as a CD-ROM, a Flash memory, or the like.

It is furthermore apparent to a person skilled in the art that the functionalities of multiple computers (data processing devices) can be combined, or combined into a single device, or that the functionality of a certain data processing device can be distributed among a plurality of devices, so as to carry out the steps of the method according to the present disclosure, without departing from the method according to the present disclosure.

The various embodiments of the present disclosure described in the present application can advantageously be combined with one another, unless indicated otherwise in the specific instance.

BRIEF DESCRIPTION OF THE DRAWINGS

The present disclosure will be described hereafter in exemplary embodiments based on the accompanying drawings. In the drawings.

DETAILED DESCRIPTION

As disclosed herein, in some examples, the individual trajectories may include position information and lane information linked thereto. The position information defines the relative position of the individual trajectory in the space, in particular by reference to a reference system. The reference system preferably involves GPS coordinates or, alternatively, preferably identification information of a routing, for example of a federal highway or an expressway, as well as route points stored in this regard. The position information is preferably available continuously, that is, for each point of the individual trajectory, or discontinuously, for example only in the form of starting and end points, or in the form of interpolation points of the individual trajectory. The lane information defines the relative position of the vehicle with respect to the position information and thus specifies the actual driving path of the vehicle within the reference system. The lane information is preferably available as a directional and/or speed vector for each point of continuous position information of the individual trajectory. Likewise, the lane information is available in the form of driving path sections, which connect interpolation points of discontinuously available position information. An arbitrary point of the trajectory thus results, for example, from a chronological sequence of vehicle movements as defined by the lane information, starting at an interpolation point of the movement, which is defined by the position information. For example, the lane information defines the actual movement of a vehicle along a road section (routing) defined by the position information.

Advantageously, using techniques of the present disclosure, the individual trajectories can be grouped based on the position information. In other words, spatially corresponding individual trajectories are preferably ascertained based on the position information. Likewise, using the method according to the present disclosure, the lane information of the spatially corresponding individual trajectories is averaged, so as to ascertain averaged lane information of the swarm trajectory. The swarm trajectory preferably includes the lane information thus averaged as well as position information, wherein the position information of the swarm trajectory corresponds to the position information of the averaged individual trajectories, or possibly matches it. The lane information of the swarm trajectory is thus preferably also available as a directional and/or speed vector for each point of continuous position information of the swarm trajectory.

In some examples, secondary information may include position information and driving dynamics information and/or shock absorption information linked thereto. The position information is preferably such that it allows the secondary information to be linked to the associated individual trajectory. Individual trajectories with continuous position information are thus preferably likewise involve continuous position information, and may be continuously detected GPS coordinates of the vehicle. The position information likewise preferably includes time stamps, or the position information includes time stamps. The position and/or lane information of the individual trajectories may also include time stamps. In this way, it is advantageously possible to link the data based on the time stamps. This embodiment of carrying out the method is particularly suitable for a more complex form of the individual trajectories with interpolation points and vectorial lane information or the like.

In some examples, shock absorption information for at least one position that is defined by position information may include a sag of at least one shock absorber of a motor vehicle. As was already described, the position information may be available as time stamps and/or as the GPS position of the vehicle. The sag of at least one shock absorber characterizes the vehicle response to traveling the linked individual trajectory; and it is meaningful, for example, for potholes or elevated regions that are present along this trajectory. Such impairments of a smooth roadway surface not only result in a loss of comfort, but they possibly also adversely affect tire grip. During the ascertainment of the swarm trajectory, shock absorption information that represents large sag therefore preferably results in a lesser weighting of the individual trajectory. Advantageously, modern shock absorption systems generally include sensors for detecting the sag, whereby the shock absorption information can be readily detected. In the method according to the present disclosure, a swarm trajectory that avoids or circumvents potholes or elevated regions along the route is thus ascertained automatically.

In some examples, the driving dynamics information for at least one position that is defined by position information includes information about a vehicle body movement and/or a transverse acceleration of a motor vehicle. As was already described, the position information is preferably available as time stamp information and/or the GPS position of the vehicle. The vehicle body movements and/or transverse acceleration of a vehicle can also be utilized to characterize the vehicle response to traveling on the linked individual trajectory, provided the relevant information has been adjusted for consequences of the vehicle's desired proper movement due to acceleration and steering. Modern vehicles generally comprise a plurality of sensors, so that the vehicle dynamics information can generally be detected without involving any major complexity. Particularly preferably, an adjustment of the data for the consequences of desired proper movements by the motor vehicle is carried out in the method according to the present disclosure.

The driving dynamics information can also be meaningful for potholes or elevated regions that are present along an individual trajectory. Such impairments of a smooth roadway surface result not only in a loss of comfort, but may possibly also adversely affect tire grip. When ascertaining the swarm trajectory, (adjusted) vehicle dynamics information that represents large vehicle body movements or transverse accelerations thus preferably results in a lesser weighting of the individual trajectory, so that a comfortable and safe swarm trajectory is advantageously ascertained. In particular, the weighted averaging of the individual trajectories automatically results in a swarm trajectory that automatically circumvents the imperfections in the roadway surface.

The secondary information likewise preferably includes position information and roadway information linked thereto. This roadway information is preferably detected by way of an optical sensor and/or a distance sensor of the motor vehicle and is thus likewise suitable for detecting defects of the roadway surface that are present ahead of the vehicle in the driving direction, such as potholes or bumps in the roadway. In this embodiment of carrying out the method, the position information preferably indicates the position of the recognized defect of the roadway surface, and not the position of the motor vehicle. In other words, the position information is corrected by the distance between the camera/sensor and the defect. In the method according to the present disclosure, individual trajectories whose secondary information includes roadway information that represents defects of the roadway surface, such as potholes or elevated regions, preferably have a lesser weighting than other individual trajectories without such defects of the roadway surface.

Furthermore, the secondary information includes position information and information linked thereto about a friction coefficient of a roadway pavement. The friction coefficient characterizes the adhesion between the tires of the motor vehicle and the roadway surface. Accordingly, a reduction of the friction coefficient, for example, due to makeshift road repairs using inferior asphalt or tar, can thus reduce driving safety. In the method according to the present disclosure, individual trajectories whose secondary information represents a low friction coefficient are therefore preferably given a lesser weighting during the ascertainment of the swarm trajectory than other individual trajectories that are linked to a higher friction coefficient. Advantageously, this results in a swarm trajectory that automatically circumvents the defects in the surface of the roadway. The friction coefficients are preferably derived in the known manner from wheel speeds.

A cross-correlation between the secondary information of the individual trajectories is likewise preferably carried out, for example, to ascertain secondary information that can be attributed to attributes of the traveled trajectory that cannot be circumnavigated. Such a cross-correlation is preferably carried out to ascertain secondary information that is available in an identical or similar manner for all individual trajectories and, if this information were only available for one or only a few trajectories, this would result in a lesser weighting of the respective trajectory. Such cross-correlations advantageously allow structures, such as speed bumps, along the individual trajectories to be recognized. Such speed bumps would otherwise result in a lesser weighting of most trajectories via the accordingly high sag, and instead, in fact, favor those trajectories in which the speed bumps were possibly impermissibly circumnavigated In some examples, the network server furthermore classifies the detected individual trajectories it has received from the motor vehicles based on the secondary information. The network server preferably classifies the individual trajectories based on the secondary information into first individual trajectories and second individual trajectories. In addition, a classification into further classes, for example, into third and fourth individual trajectories, is likewise possible. The classification is preferably carried out based on secondary information that allows the individual trajectories to be classified, such as secondary information about a vehicle type (truck, passenger car, sports car, van, etc.) or about an average speed (spirited driver, ecological driver). According to this embodiment of carrying out the method, the network server furthermore ascertains at least one first swarm trajectory based on the first individual trajectories, and a second swarm trajectory based on the second individual trajectories. If a classification of the individual trajectories into further classes has optionally taken place, a second and a third swarm trajectory are optionally also ascertained accordingly.

The network server may further transmit the first swarm trajectory to at least one first motor vehicle corresponding to a first individual trajectory, for example, to a first motor vehicle that is approaching a routing that spatially corresponds to the first individual trajectories. Furthermore, the network server transmits the second swarm trajectory to at least one second motor vehicle corresponding to a second individual trajectory, for example, to a second motor vehicle that is approaching a routing that spatially corresponds to the second individual trajectories. In this way, different swarm trajectories can advantageously be provided for different categories (classes) of vehicles or drivers by way of the method according to the present disclosure, which take into account the specific properties of the different vehicles or the specific driving behavior by the drivers.

In some examples, a motor vehicle, such as a passenger car comprising an internal combustion engine, an electric motor or a hybrid powertrain, may be configured to carry out the steps of a motor vehicle in the method according to the present disclosure. For this purpose, the motor vehicle includes at least one first sensor, which is configured to detect environment data, and at least one second sensor, which is configured to detect vehicle data.

The at least one first sensor is designed to detect sensor signals related to the environment of the vehicle. The at least one second sensor is designed to detect sensor signals related to the vehicle itself. In the process, an environment signal received by means of the at least one first sensor preferably enables the motor vehicle to learn about its environment and preferably maps a plurality of environmental information. A status signal received by means of the at least one second sensor preferably enables the motor vehicle to learn about its proper status and, for this purpose, preferably maps a plurality of status information.

The motor vehicle may also include a first communication module for communicating with a network server and GPS satellites. In addition, the communication module can be configured to communicate with further devices, such as further vehicles or a smart infrastructure. The communication module preferably comprises a radio, mobile radio, WLAN and/or Bluetooth transceiver, or alternative wireless communication devices.

The motor vehicle may also include a first control unit that is configured to communicate with the at least one first sensor for detecting environment data of a motor vehicle, with the at least one second sensor for detecting status data of the motor vehicle, and with the first communication module of the motor vehicle. The control unit may be configured to carry out the steps of the motor vehicle in the method according to the present disclosure. The first control unit is, in particular, designed to detect secondary information, including driving dynamics, shock absorption and/or roadway information corresponding to the position information for an individual trajectory which is traveled by the motor vehicle and determined by position information and lane information by means of the first sensors and/or second sensors. The control unit may further be configured to transmit the individual trajectory and the secondary information linked thereto to a network server, preferably by accordingly activating the communication module to transmit this data to the network server. Preferred embodiments of the motor vehicle correspond to the preferred embodiments of carrying out the method as described herein.

In some examples, the motor vehicle may include a driving system configured to automatically operate the motor vehicle. The driving system of the motor vehicle may be configured to carry out at least one automatic driving maneuver/automated driving operation of the vehicle. The driving system may be designed to fully automatically guide the motor vehicle, and control the longitudinal guidance as well as the transverse guidance of the motor vehicle. Further preferably, the driving system can access the at least one first sensor and/or the at least one second sensor for determining status information and/or environment information of the motor vehicle. These first and second sensors can thus preferably be utilized by the driving system and by the control unit.

In some examples, the driving system communicates with the control unit that, according to this embodiment, is furthermore configured to receive a swarm trajectory, as determined by position information and lane information, from the network server and to ascertain a trajectory for the motor vehicle by means of the driving system and based on the received swarm trajectory. The trajectory of the motor vehicle is further preferably used to carry out an automated driving operation of the motor vehicle and/or for displaying navigation advice.

Common motor vehicles include, even today, a plurality of sensors that, as first sensors, continually detect different environment information, such as a surface of a roadway that extends ahead of the vehicle. Furthermore, today's vehicles also already comprise second sensors for detecting status information, such as, for example, the sag of vehicle shock absorbers or wheel speeds, or the like. Modern vehicles are additionally equipped with powerful communication modules, which allow information to be transmitted via a plurality of channels. The method according to the present disclosure uses these existing sensors and the communication module for a new advantageous application.

Another aspect of the present disclosure relates to a method of a control unit of a motor vehicle which comprises at least one first sensor configured to detect environment data, at least one second sensor configured to detect status data of the motor vehicle, and a communication module, a driving system configured to automatically drive the motor vehicle, as well as the control unit, wherein the method includes at least the following steps: detecting an individual trajectory traveled by the motor vehicle and determined by position information and lane information; detecting secondary information, including driving dynamics, shock absorption and/or roadway information corresponding to the individual trajectory, in particular by suitably activating the first sensors and/or second sensors; and transmitting the individual trajectory and the secondary information linked thereto to a network server.

Another aspect of the present disclosure relates to a computer program, encompassing commands that, when the program is executed by a computer, such as a control unit of a motor vehicle, prompt the computer to carry out the steps of the motor vehicle corresponding to the method according to the present disclosure, in particular the following steps: detecting secondary information for an individual trajectory that is traveled by the motor vehicle and determined by position information and lane information, including driving dynamics, shock absorption and/or roadway information corresponding to the individual trajectory, in particular by suitably activating the first sensors and/or second sensors; and transmitting the individual trajectory and the secondary information linked thereto to a network server.

Another aspect of the present disclosure relates to a network server, comprising a second communication module, which is configured for the data communication with a multitude of motor vehicles, and a second control unit. The network server furthermore comprises a second control unit, which is configured to communicate with the first communication module of at least one motor vehicle by means of a second communication module. The control unit is furthermore configured to carry out the steps of the network server of in the method according to the present disclosure and is, in particular, configured to receive particular individual trajectories, determined by position information and lane information, from a multitude of motor vehicles, to ascertain a swarm trajectory based on the individual trajectories and the secondary information linked thereto as a weighted average of the individual trajectories based on the secondary information, and to transmit the ascertained swarm trajectory to at least one motor vehicle. The execution the individual steps and preferred embodiments of carrying out the steps correspond to the preferred embodiments described with reference to the method according to the present disclosure.

Another aspect the present disclosure relates to a method of a network server of a motor vehicle, which comprises at least one memory, a second communication module that is configured to communicate with a first communication module of at least one motor vehicle, and a second control unit, the method at least comprising the following steps: receiving individual trajectories, determined based on position information and lane information, from a multitude of motor vehicles; ascertaining a swarm trajectory based on the individual trajectories and the secondary information linked thereto as a weighted average of the individual trajectories based on the secondary information; and transmitting the ascertained swarm trajectory to a motor vehicle.

Another aspect of the present disclosure relates to a computer program, comprising commands that, when the program is executed by a computer, such as, for example, a control unit of a network server, prompt the computer to carry out the steps of the network server in the method according to the present disclosure, in particular the following steps: receiving individual trajectories, determined by position information and lane information, from a multitude of motor vehicles; ascertaining a swarm trajectory based on the individual trajectories and the secondary information linked thereto as an average of the individual trajectories that is weighted based on the secondary information; and transmitting the averaged swarm trajectory to a motor vehicle.

Another aspect of the present disclosure relates to a system composed of a motor vehicle according to the present disclosure, as described above, and a network server according to the present disclosure, as described above. Preferred embodiments of the system correspond to the preferred embodiment described with reference to the motor vehicle and the server and the preferred embodiments of carrying out the method.

In some examples, a swarm trajectory may be ascertained based on individual trajectories whose position information corresponds to each other. In other words, the weighted average of those individual trajectories is calculated that, in principle, relate to the same routing, that is, for example, the same road section. Depending on the type of position information, the ascertainment of the corresponding individual trajectories differs. If the position information encompasses identification information of a road or of a road section as the reference system, corresponding individual trajectories are preferably ascertained based on identical position information. If, in contrast, the position information encompasses continuous or discontinuous GPS coordinates, corresponding individual trajectories are preferably ascertained based on similar position information, for example, taking into consideration a maximum permissible distance between the GPS coordinates or the like.

In some examples, the ascertained swarm trajectory may likewise be transmitted to a motor vehicle whose position information corresponds to the position information of the ascertained swarm trajectory, that is, the position information of the underlying individual trajectories. In this way, it is advantageously ensured that the vehicle can use the transmitted swarm trajectory, for example, for guiding the vehicle fully or semi-automatically or for displaying navigation advice.

In some examples, the network server may ascertain at least one vehicle with corresponding position information and transmits an ascertained swarm trajectory thereto. As a preferred alternative, the network server receives a request for a swarm trajectory from a motor vehicle, together with current position information of the requesting motor vehicle, and ascertains an ascertained swarm trajectory corresponding to the position information, and it transmits the same to the requesting motor vehicle.

Figure 1:
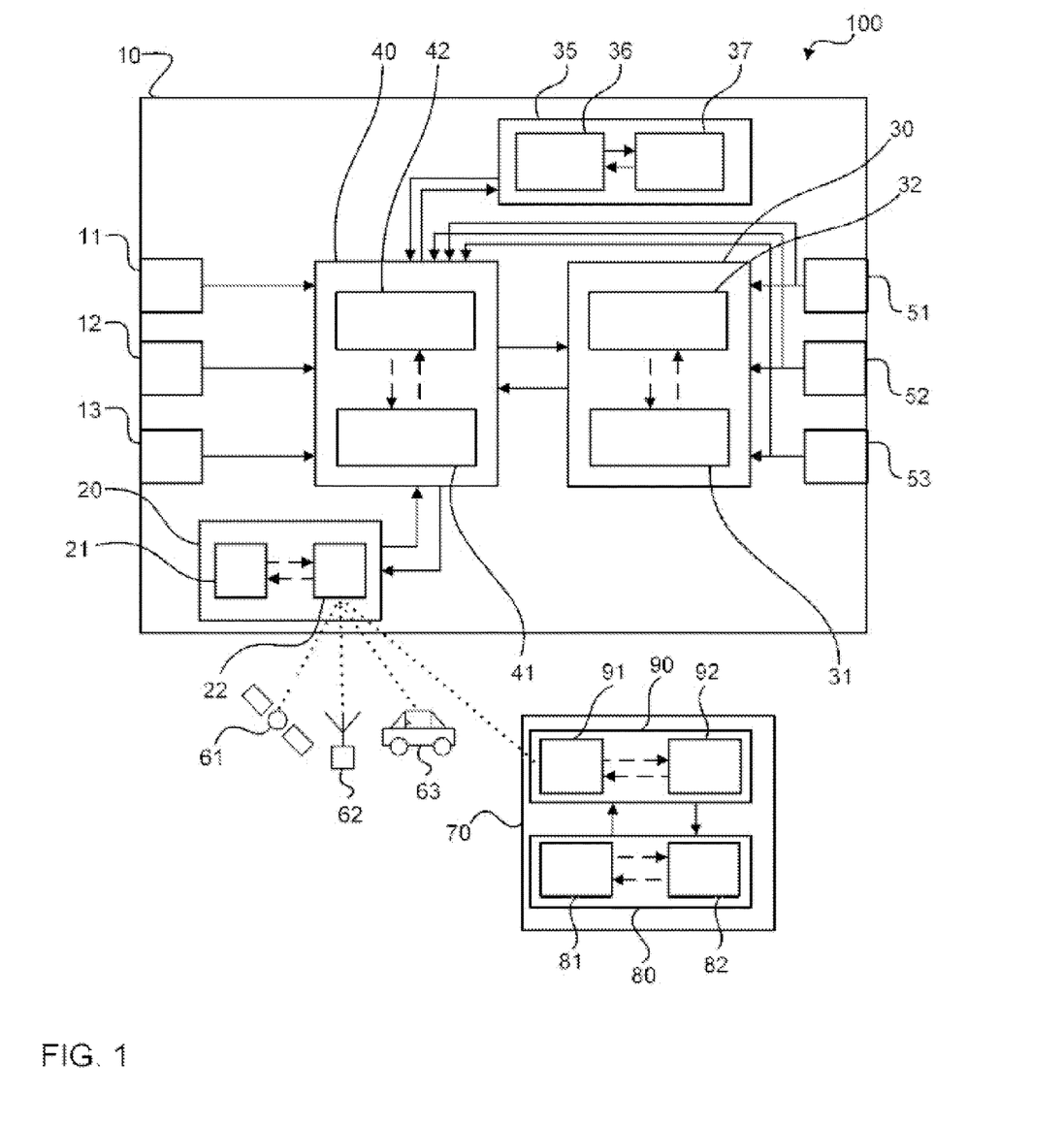
FIG. 1 shows a schematic representation of a system that includes a motor vehicle and a mobile network server according to some aspects of the present disclosure.

FIG. 1 shows a schematic representation, in particular a block diagram, of an exemplary motor vehicle 10, in particular of a dual-track motor vehicle comprising an internal combustion engine, electric motor or hybrid powertrain. The motor vehicle 10 may include a plurality of first sensors, in particular a first sensor 11, a second sensor 12, and a third sensor 13. The first sensors 11, 12, 13 are configured to detect environment data of the motor vehicle 10 and comprise, for example, a camera for recording an image of an environment directly surrounding the motor vehicle 10, distance sensors, such as, for example, ultrasonic sensors or LIDAR, for detecting distances relative to objects surrounding the motor vehicle 10. The first sensors 11, 12, 13 transmit the environment signals they detected to a first control unit 40 of the motor vehicle 10.

In this example, the motor vehicle 10 furthermore includes a plurality of second sensors, in particular a fourth sensor 51, a fifth sensor 52, and a sixth sensor 53. The second sensors 51, 52, 53 are sensors for ascertaining status data related to the motor vehicle 10 itself, such as current position and movement information of the motor vehicle. The second sensors are consequently, for example, speed sensors, acceleration sensors, inclination sensors, sensors for measuring sag of a shock absorber, wheel speed sensors, or the like. The second sensors 51, 52, 53 transmit the status signals they detected to the first control unit 40 of the motor vehicle 10. In addition, the second sensors 51, 52, 53 transmit their measurement results directly to a driving system 30 of the motor vehicle 10.

The motor vehicle 10 furthermore includes a first communication module 20, including a memory 21 and one or more transponders or transceivers 22. The transponders 22 are a radio, WLAN, GPS or Bluetooth transceiver, or the like. The transponder 22 communicates with the internal memory 21 of the first communication module 20, for example, via a suitable data bus. By means of the transponder 22, it is possible, for example, to ascertain the current position of the motor vehicle 10 by communicating with a GPS satellite 61, and this position can be stored in the internal memory 21. Likewise, authorization information stored in the memory 21 can be transmitted to an external communication module by means of the transponder 22. The first communication module 20 also communicates with the first control unit 40. In addition, the first communication module 20 is configured to communicate with a mobile network server 70, in particular a back-end server of a vehicle manufacturer, contract partner or fleet operator. The communication is carried out, in particular, by way of a second communication module 90 of the network server 70. The first communication module 20 is preferably configured to communicate via an LTE mobile communication network.

The motor vehicle 10 furthermore includes a driving system 30, which is configured for the fully automated driving operation, in particular for longitudinal and transverse guidance, of the motor vehicle 10. The driving system 30 comprises a navigation module 32, which is configured to calculate routes between a starting point and a destination and to ascertain the maneuvers to be carried out along this route by the motor vehicle 10. In addition, the driving system 30 comprises an internal memory 31, for example, for map materials which communicates with the navigation module 32, for example, via a suitable data bus. The driving system 30 furthermore communicates with the control unit 40 and receives trajectory information, which was received from the network server 70, from the control unit 40 by means of the first communication module 20. The navigation module 32 is preferably configured to ascertain a route of the motor vehicle 10 based on this trajectory information.

At least some of the second sensors 51, 52, 53 of the motor vehicle 10 transmit their measurement results directly to the driving system 30. This data transmitted directly to the driving system 30 is in particular current position and movement information of the motor vehicle. This information is preferably detected by speed sensors, acceleration sensors, inclination sensors, etc.

The motor vehicle 10 furthermore comprises a first control unit 40, which is configured to carry out the steps of the motor vehicle 10 in the method according to the present disclosure. For this purpose, the first control unit 40 comprises an internal memory 41 and a CPU 42, which communicate with one another, for example, via a suitable data bus. The first control unit 40 is additionally communicatively connected to at least the first sensors 11, 12, 13, the second sensors 51, 52, 53, the first communication module 20 and the driving system 30, for example, via one or more respective CAN connections, one or more respective SPI connections, or other suitable data links.

The network server 70 may include a second control unit 80, which is configured to carry out the steps of the network server 70 in the method according to the present disclosure. For this purpose, the second control unit 80 comprises an internal memory 81 and a CPU 82, which communicate with one another, for example via a suitable data bus. The network server 70 furthermore comprises a second communication module 90. The second communication module 90 comprises a memory 92 and one or more transponders or transceivers 91. The transponders 91 are a radio, WLAN, GPS or Bluetooth transceiver, or the like. The transponder 91 communicates with the internal memory 92 of the second communication module 90, for example, via a suitable data bus. The second communication module 90 is preferably configured to communicate via an LTE mobile communication network.

Figure 2:
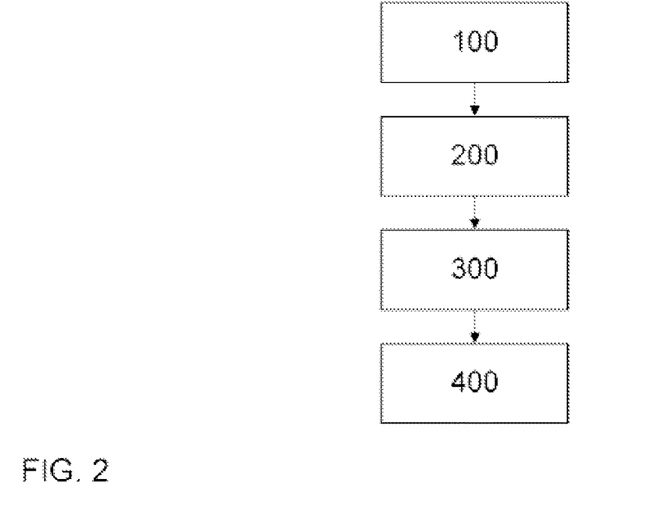
FIG. 2 shows a schematic representation of a method according to some aspects of the present disclosure.

FIG. 2 shows a schematic flow chart of a method according to the present disclosure carried out by the system 100.

In a first step S100 of the method according to the present disclosure, a multitude of motor vehicles in each case detect an individual trajectory traveled by the motor vehicle, and secondary information linked to the respective individual trajectory. In a second step S200 of the method according to the present disclosure, each of the multitude of motor vehicles transmits the detected individual trajectory and the (likewise detected) secondary information linked thereto to a network server. In a third step S300 of the method according to the present disclosure, the network server ascertains, by way of calculation, a swarm trajectory based on the individual trajectories and the secondary information linked thereto, as an average of the individual trajectories that is weighted based on the secondary information. In step S400, the network server transmits the ascertained swarm trajectory to at least one motor vehicle.

Figure 3:
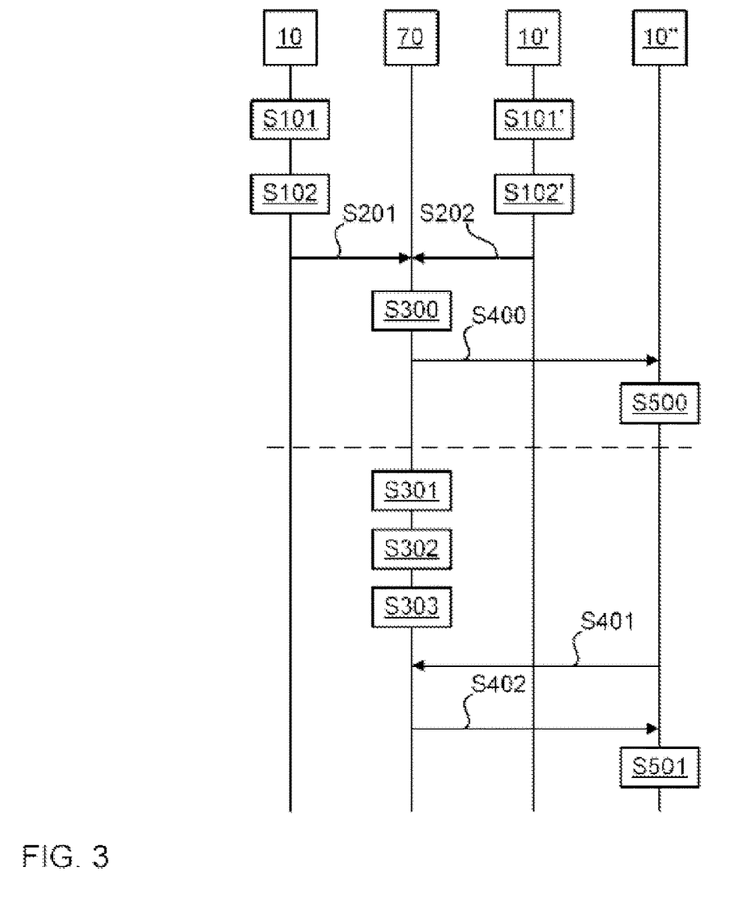
FIG. 3 shows a schematic representation of the communication between a network server and motor vehicles in the method according to some aspects of the present disclosure.

FIG. 3 shows a schematic representation of the communication between a network server 70 according to the present disclosure and motor vehicles 10, in particular the communication between a network server 70, which has been described with reference to FIG. 1, and three vehicles 10, 10', 10" according to the present disclosure, each of which is designed as described with reference to FIG. 1.

In a step S101, a first motor vehicle 10, such as a light truck, detects the individual trajectory that it has traveled, in particular position information and lane information of the individual trajectory. Furthermore, in step S102, the first motor vehicle 10, detects secondary information that allows a characterization of the roadway and/or of the driving behavior of the motor vehicle 10 while moving along the detected individual trajectory. In a step S201, the motor vehicle 10 transmits the detected individual trajectory, as well as the detected secondary information, to the network server 70.

At another point in time, in a step S101', a second motor vehicle 10', such as a sports car, likewise detects an individual trajectory that it has traveled, in particular position information and lane information of the individual trajectory, wherein the position information is similar or identical to the position information detected by the first motor vehicle 10. Furthermore, in a step S102', the second vehicle 10', also detects secondary information for characterizing the roadway or the driving behavior of the vehicle 10" along the individual trajectory. In a step S202, the vehicle 10' transmits the detected individual trajectory and secondary information to the network server 70.

In a step S300, the network server 70 ascertains, by way of calculation, a swarm trajectory, based on the individual trajectories received from the vehicles 10 and 10' and the secondary information linked thereto, as an average of the individual trajectories that is weighted based on the secondary information. In step S400, the swarm trajectory thus ascertained is transmitted from the network server to a further motor vehicle 10" which is approaching a road section that corresponds to the position information of the individual trajectories and the ascertained swarm trajectory. Based on the received swarm trajectory, the further motor vehicle 10", in step S500, ascertains a trajectory that it must travel in the road section, and it drives automatically along this trajectory or outputs navigation advice to a driver for traveling the ascertained trajectory.

In FIG. 3, another embodiment of carrying out the method according to the present disclosure is separated by a dotted line. In this example, the network server 70, in step S301, furthermore carries out a classification of the received individual trajectories based on the secondary information corresponding thereto. According to this embodiment, the secondary information received from the vehicle 10 contains an indicator whereby the vehicle 10 is a light truck, and the secondary information received from the vehicle 10' contains an indicator whereby the vehicle 10' is a sports car. Thereupon, the network server 70 classifies the individual trajectory received from the vehicle 10 as the first individual trajectory, and the individual trajectory received from the vehicle 10' as the second individual trajectory.

In a step S302, the network server 70 ascertains a first swarm trajectory based on the first individual trajectory of the motor vehicle 10 and based on the first individual trajectories it received from other light trucks, whose position information corresponds to the position information of the individual trajectory it received from the motor vehicle 10. The swarm trajectory is ascertained as an average of the first individual trajectories that is weighted based on the secondary information linked to the first individual trajectories.

In a step S303, the network server 70 ascertains a second swarm trajectory based on the second individual trajectory of the motor vehicle 10' and based on the second individual trajectories it received from other sports cars, whose position information corresponds to the position information of the individual trajectory it received from the motor vehicle 10'. The swarm trajectory is ascertained as an average of the second individual trajectories that is weighted based on the secondary information linked to the second individual trajectories.

In step S401, the network server 70 receives a request from a motor vehicle 10" for a swarm trajectory for a particular road section. For this purpose, the request includes position information of the motor vehicle 10' and/or of the particular road section. The request furthermore includes an identifier identifying the vehicle 10" as a light truck. Thereupon, the network server 70 ascertains a first swarm trajectory corresponding to the received position information, which was generated based on the individual trajectories of other light trucks along the particular road section, and, in step S402, it transmits the swarm trajectory thus ascertained to the motor vehicle 10". Based on the received first swarm trajectory, the vehicle 10", in step S501, ascertains a trajectory it must travel in the particular road section, and it drives automatically along this trajectory, or it outputs navigation advice to a driver.

LIST OF REFERENCE NUMERALS 10 motor vehicle
11 first sensor
12 second sensor
13 third sensor
20 communication module
21 memory
22 transponder
30 driving system
31 memory
32 navigation module
40 control unit
41 memory
42 CPU
51 fourth sensor
52 fifth sensor
53 sixth sensor
61 satellite
70 network server
80 control unit
81 memory
82 CPU
90 communication module
91 transponder
92 memory
100 system

The invention claimed is:

1. A method for ascertaining a vehicle trajectory, comprising:
    detecting, by a plurality of motor vehicles, traveled individual trajectories and secondary information linked to the individual trajectories, wherein the individual trajectories comprise position information and lane information linked thereto, and the secondary information includes data related to vehicle dynamics, road conditions, and/or traffic patterns as sensed by onboard sensors and processed to form the individual trajectories and associated secondary information;
    transmitting, by the plurality of motor vehicles, the individual trajectories and the secondary information linked thereto to a network server;
    aggregating and processing, by the network server, the received individual trajectories, including the position information and the secondary information linked thereto to ascertain a swarm trajectory, wherein the network server utilizes the secondary information to dynamically weight the individual trajectories based on varying road conditions, vehicle dynamics, and traffic patterns;
    configuring the swarm trajectory for transmission to at least one motor vehicle based on the aggregated position information and the secondary information; and
    transmitting, via wireless communication, the configured swarm trajectory to the at least one motor vehicle; and
    automatically adjusting, by the at least one motor vehicle using a driving system, its current trajectory based on the received swarm trajectory, resulting in modified vehicle steering, acceleration, or braking.

2. The method according to claim 1, wherein the secondary information comprises vehicle body movement data detected by the onboard sensors.

3. The method according to claim 1, wherein the secondary information comprises position information and driving dynamics information, shock absorption information or roadway information linked thereto.

4. The method according to claim 3, wherein the shock absorption information for at least one position defined by position information comprises a sag of at least one shock absorber of a motor vehicle.

5. The method according to claim 3, wherein the driving dynamics information for at least one position defined by position information comprises at least one of (i) information about a vehicle body movement, (ii) transverse acceleration of a motor vehicle, and/or (iii) information about a friction coefficient of a roadway pavement.

6. The method according to claim 1, furthermore comprising:

classifying, by the network server, the detected individual trajectories based on the secondary information into first individual trajectories and second individual trajectories;

ascertaining, by the network server, a first swarm trajectory based on the first individual trajectories and a second swarm trajectory based on the second individual trajectories, and based in each case on secondary information linked thereto.

7. The method according to claim 6, further comprising transmitting, from the network server, the first swarm trajectory to at least one first motor vehicle corresponding to a first individual trajectory, and the second swarm trajectory to at least one second motor vehicle corresponding to a second individual trajectory.

8. A motor vehicle, comprising:
at least one first sensor, configured to detect environment data;
at least one second sensor configured to detect vehicle data;
a first communication module for communicating with a network server and a global positioning system (GPS); and
a control unit, the control unit being configured to:
detect secondary information, comprising one or more of driving dynamics, shock absorption and/or roadway information corresponding to an associated individual trajectory which is traveled by the motor vehicle and determined by position information and lane information via the first sensors and/or second sensors;
transmit the individual trajectory and secondary information linked thereto to the network server for aggregating and processing; and
receive a swarm trajectory from the network server, the swarm trajectory being based on aggregated and processed data from multiple motor vehicles; and
adjust the motor vehicle's trajectory based on the received swarm trajectory and current vehicular and environmental data.

9. The motor vehicle according to claim 8, wherein the secondary information comprises one of position information, driving dynamics information, shock absorption information or roadway information.

10. The motor vehicle according to claim 9, wherein the shock absorption information comprises a sag of at least one shock absorber of the motor vehicle.

11. The motor vehicle according to claim 9, wherein the driving dynamics information comprises at least one of (i) information about a vehicle body movement, (ii) transverse acceleration of a motor vehicle, and/or (iii) information about a friction coefficient of a roadway pavement.

12. The motor vehicle according to claim 8, furthermore comprising, receiving, from the network server, a first swarm trajectory to at least one first motor vehicle corresponding to a first individual trajectory, and a second swarm trajectory to at least one second motor vehicle corresponding to a second individual trajectory.

13. The motor vehicle of claim 12, wherein the received first swarm trajectory is based on classified first individual trajectories and second individual trajectories, based on the secondary information.

14. The motor vehicle of claim 12, furthermore comprising:
a driving system configured to automatically drive the motor vehicle, wherein the control unit is further configured to receive the first swarm trajectory, determined by position information and lane information, from the network server; and
ascertain a trajectory for the motor vehicle via the driving system, based on the swarm trajectory.

15. A method for ascertaining a vehicle trajectory at a network server, comprising:
receiving, from a plurality of motor vehicles, traveled individual trajectories and secondary information linked to the individual trajectories, wherein the individual trajectories comprise position information and lane information linked thereto, and the secondary information comprises data related to vehicle dynamics, road conditions, and/or traffic patterns as sensed by onboard sensors;
aggregating and processing, by the network server, the received individual trajectories including the position information and the secondary information linked thereto to ascertain a swarm trajectory, wherein the network server utilizes the secondary information to dynamically weight the individual trajectories based on varying road conditions, vehicle dynamics, and traffic patterns; and
configuring the swarm trajectory for at least one motor vehicle based on the aggregated position information and the secondary information; and
transmitting, via wireless communication, the configured swarm trajectory to the at least one motor vehicle; and
automatically adjusting, by the at least one motor vehicle using a driving system its current trajectory based on the received swarm trajectory, resulting in modified vehicle steering, acceleration, or braking.

16. The method according to claim 15, wherein the secondary information includes vehicle body movement data detected by the onboard sensors.

17. The method according to claim 15, wherein the secondary information comprises position information and driving dynamics information, shock absorption information or roadway information linked thereto.

18. The method according to claim 17, wherein the shock absorption information for at least one position defined by position information comprises a sag of at least one shock absorber of a motor vehicle.

19. The method according to claim 17, wherein the driving dynamics information for at least one position defined by position information comprises at least one of (i) information about a vehicle body movement, (ii) transverse acceleration of a motor vehicle, and/or (iii) information about a friction coefficient of a roadway pavement.

20. The method according to claim 15, furthermore comprising:
classifying, by the network server, the received individual trajectories based on the secondary information into first individual trajectories and second individual trajectories;
ascertaining, by the network server, a first swarm trajectory based on the first individual trajectories and a second swarm trajectory based on the second individual trajectories, and based in each case on secondary information linked thereto; and
transmitting, from the network server, the first swarm trajectory to at least one first motor vehicle corresponding to a first individual trajectory, and the second swarm trajectory to at least one second motor vehicle corresponding to a second individual trajectory.

* * * * *